United States Patent [19]
Ashcraft et al.

[11] Patent Number: 4,869,955
[45] Date of Patent: Sep. 26, 1989

[54] POLYESTER SUPPORT FOR PREPARING ELECTROSTATIC TRANSPARENCIES

[75] Inventors: Robert W. Ashcraft, Towanda, Pa.; John H. Bayless, Hendersonville, N.C.

[73] Assignee: E. I. Du Pont De Nemours and Company, Wilmington, Del.

[21] Appl. No.: 167,057

[22] Filed: Mar. 11, 1988

[51] Int. Cl.[4] ........................ B32B 5/16; B32B 27/14; B32B 27/18

[52] U.S. Cl. .................................... 428/327; 428/518; 428/520; 428/480

[58] Field of Search ............... 428/327, 442, 518, 520, 428/480

[56] References Cited

U.S. PATENT DOCUMENTS

| | | | |
|---|---|---|---|
| 3,539,340 | 11/1970 | Dolce et al. | 96/1.4 |
| 3,549,360 | 12/1970 | O'Neill et al. | 96/1.4 |
| 3,949,148 | 4/1976 | Akman | 428/500 |
| 4,085,245 | 4/1978 | De Vito et al. | 428/337 |
| 4,132,552 | 1/1979 | Van Paesschen et al. | 428/483 |
| 4,320,186 | 3/1982 | Kato et al. | 430/98 |
| 4,481,252 | 11/1984 | Postle et al. | 428/327 |
| 4,489,122 | 12/1984 | Kammin et al. | 428/212 |
| 4,621,009 | 11/1986 | Lad | 428/216 |
| 4,701,837 | 10/1987 | Sakaki et al. | 346/135.1 |
| 4,711,816 | 12/1987 | Wittnebel | 428/518 |

FOREIGN PATENT DOCUMENTS

| | | |
|---|---|---|
| 2644089 | 4/1978 | Fed. Rep. of Germany . |

*Primary Examiner*—George F. Lesmes
*Assistant Examiner*—J. Davis

[57] ABSTRACT

An element suitable for preparing transparencies using an electrostatic plain paper copier is described. This element comprises a polyethylene terephthalate support (polyester), at least one subbing layer coated thereon and coated to the subbing layer a toner receptive layer comprising a mixture of an acrylate binder, a polymeric antistatic agent having carboxylic acid groups, a cross-linking agent, butylmethacrylate modified polymethacrylate beads and submicron polyethylene beads. These elements produce excellent transparencies.

3 Claims, No Drawings

POLYESTER SUPPORT FOR PREPARING ELECTROSTATIC TRANSPARENCIES

BACKGROUND OF THE INVENTION

1. Field of the Invention:

This invention relates to an improved polyester support for use in preparing electrostatic transparencies. More particularly, this invention relates to a polyester support with an improved surface applied thereon, one which has substantially improved image and processing capabilities in electrostatic plain paper copy machines.

2. Description of the Prior Art:

As is well-known, applying an image on a support using electrostatic imaging processes requires imparting a uniform electrostatic charge (either positive or negative) to a photoconducting surface which is conventionally, a selenium drum element as the photoconducting surface in this process. A corona discharge system is used to impart this charge to the drum which is then imaged through a lens system to a document or article to be imaged. In areas where the light strikes the photoconducting surface, the charge is dissipated via a grounding process, while the electrostatic image remains intact in the image areas. After this process, toner particles of opposite charge are applied to the drum and clings, via an electrostatic attraction, to the charged areas of the surface. A sheet on which the image is to be recorded, is then passed in contact with the charged drum and another corona discharge applied thereon. As a result, a large portion of the charged toner on the drum is transferred to the sheet. Finally, the toner is fused on this sheet, usually by applying heat, pressure or a combination of both.

Elements useful in preparing transparencies using this electrostatic imaging process are legion in number. Most of these elements employ some sort of transparent support and coated thereon, a toner receptive layer. Many of these elements describe the use of polyester supports such as polyethylene terephthalate as the transparent support since this element is well-known for its dimensional stability which is a great advantage. Toner receptive layers applied on these polyester supports must have a number of special characteristics since it is difficult to coat layers on these supports. Additionally, the toner receptive layers that are applied on to these polyester supports must faithfully record the required image since they usually are employed as overhead transparencies and the like. Thus, the image is greatly enlarged and any deficiency in the recorded image is greatly amplified. Also, when multiple sheets of polyester film are used within standard plain paper copy machines, they must feed into the system in a normal manner. Polyester tends to build up a static charge very easily and thus jams can occur in a machine when polyester sheets are used within the ambit described above. Conventionally, sheets of paper are interleaved between each film and/or a stripe applied to the film surface to enhance the feeding of these films thorugh the electrostatic plain paper copy machines.

There are a host of elements available for use within the system described. These usually employ polyester as the film support suitably treated or subbed to receive a variety of layers applied thereon to record the image and to assist in transfer of the film element through the machinery conventionally used to make said image. Many of these elements can produce good images but process poorly through the transfer machine. Others transfer easily, but have poor resulting images. Thus, it is an object of this invention to prepare an element useful in preparing overhead transparencies in plain paper electrostatic copiers. It is also an object of this invention to prepare an element which not only processes satisfactorily within said plain paper copier but which will have superior image quality.

SUMMARY OF THE INVENTION

These and other objects are achieved by providing an element suitable for preparing electrostatic transparencies comprising a polyester support having coated thereon in order at least one subbing layer, and a toner receptive layer wherein said toner receptive layer comprises an acrylate binder containing carboxylic acid groups, a polymeric antistatic agent containing carboxylic acid groups, a cross-linking agent, butylmethacrylate modified polymethacrylate beads and polyethylene or tetrafluoroethylene beads.

DETAILED DESCRIPTION OF THE INVENTION

As a preferred process for preparing the transparent element suitable for use as an electrostatic transparency, there is provided a process for preparing an aqueous dispersion suitable for coating on a polyester support for use as a toner receptive layer which comprises:

a) preparing an aqueous solution of a cross-linking agent and a polymeric antistatic agent having pendent carboxylic acid groups thereon;

b) adjusting the pH of the above dispersion to 6.0 to 6.9;

c) adding thereto a mixture of an ammonia water soluble polyacrylate binder having pendant carboxylic acid groups and butylmethacrylate modified polymethacrylate beads dispersed in aqueous ammonia; and, d) dispersing submicron polyethylene beads (also called microspheres) therein: wherein the final pH of said coating dispersion is above 7.0.

e) coating the dispersion onto a support material.

When a dispersion is made as described above, it is suitable for application on a subbed, polyester support and can be used further in an electrostatic plain copy copier to obtain high quality transparencies therefrom.

Conventional, dimensionally stable polyethylene terephthalate film support can be used as the polyester support within the ambit of the invention. These films are described in detail in Alles, U.S. Pat. No. 2,779,684 and the references incorporated therein. Polyesters are usually made by the polyesterification product of a dicarboxylic acid and a dihydric alcohol, as described in the aforementioned Alles patent. Since polyesters are very stable, they are the preferred films of this invention. However, it is extremely difficult to coat an aqueous dispersion on the surface of a dimensionally stable polyester support. It is, therefore, conventionally necessary to apply a subbing layer contiguous to the support to aid in the coating and anchorage of subsequent layers. In this invention, application is preferred of resin subbing layer such as a modified mixed-polymer subbing composition of vinylidene chloride-itaconic acid as taught by Rawlins, U.S. Patent No. 3,567,452. This layer may be applied prior to a biaxial stretching step in which dimensional stability is obtained within the film structure. The aqueous, toner receptive layer of this invention may then be applied thereto and the element heat treated to remove strain and tension in the base, comparable to the annealing of glass. Air temperature of from 100°-160° C. are typically used for this heat treatment which is referred to as the post- stretch-heat-relax step of polyester base manufacture. These steps are all old and well-known to those of ordinary skill in the art of polyester base manufacture. Thus, one of the advantages of this invention is the application of the aqueous dispersion of the toner receptor layer within the conventional processes normally used to manufacture polyester films. Since these facilities are well-known manufacturing systems for the making of photographic film base, it is a simple matter to substitute the dispersion of this invention into the elements used to apply the conventional gel sub layer within the aforesaid manufacture of photographic film base.

The formulation of the aqueous dispersion useful in coating the toner receptive layer of this invention is very specific. The elements useful within this dispersion have been chosen for their specific characteristics and utility. It is necessary to have a layer which is toner receptive. However, the element on which the toner receptive layer is coated must be able to pass satisfactorily through conventional electrostatic copy machines without jamming in the copiers and without scratching. Thus, this element must have a reduced tendency to produce scratches, exhibit low transmission haze, have good antistatic properties, and good slip properties in order to produce a transparency which has good processability in the copy machine and excellent image quality. Yet another advantage that can be achieved within this invention, is the ability of coating from an aqueous solution. Many of the prior art elements use various organic solvents to achieve their coatings and then the problem of the disposal of the solvent is present. In this invention, the aqueous systems do not present solvent disposal problems which is environmentally advantageous.

In order to make a toner receptive layer that will perform successfully within the metes and bounds of this invention, an aqueous ammonia solution is employed which contains a binder, an antistatic agent, a cross-linking agent, and beads of two different compositions and sizes. Additionally, other materials, such as surfactants of various types, may be present to asist in the coating thereof.

Conventional ammonia soluble water acrylate polymeric binders can be used within this invention. Polymers made from alkyl methacrylate, an alkylacrylate and acrylic or methacrylic acid are particularly preferred. Ammonia water soluble acrylate-type binders include: Elvacite acrylates made by E. I. du Pont de Nemours and Company and Carboset ® acrylates made by B. F. Goodrich. These binders are usually present in amounts of 40% to 80% by weight of the total coating solids, and preferably in amounts of 55% to 65% by weight.

Cross-linking agents that will cross-link carboxylic acid groups of various elements present within the layer, are legion in number. Polyfunctional aziridinyl cross-linking agents well known to those skilled in the art are preferred. Aziridinyl cross-linking agents are useful in cross-linking one layer to another layer. Thus, the toner receptive layer of this invention, with a cross-linking agent such as an aziridinyl has good adhsion to the sub layer placed thereunder. Aziridines particularly useful are described in Schadt, U.S. Pat. No. 4,225,665 and Miller, U.S. Pat. No. 4,701,403, incorporated herein by reference. Other cross-linking agents which can be used within the ambit of this invention include: melamine formaldehyde and epoxies which are well known in the art. These cross-linking agents are usually present in an amount from 3% to 20% by weight of the coating solution solids and preferably from 6% to 12%.

In order to solve the problems of static, an antistatic agent is conventionally included within the layer structure. This agent is preferably polymeric in nature with carboxylic acid groups to be compatible with other elements in the layer and be cross-linkable in order to insure that this component is firmly attached therein. More preferably, this polymeric antistatic agent is a copolymer of the sodium salt of styrene sulfonic acid with maleic acid (M.W. ca. 5,000) in a 3:1 mole ratio. This antistatic agent is described in Cho, U.S. Pat. No. 4,585,730. The antistatic agents can be present in the coating solution solds in an amount from 5% to 30% by weight and preferably from 15% to 25% by weight.

In order to improve scratch resistance polyethylene or tetrafluoroethylene beads are included within this layer. These beads have a particle size of less than one micron, e.g., about 0.005 micron to 0.99 micron, and preferably 0.1 micron to 0.2 micron. In addition to thses beads, other beads of a somewhat larger size are added to improve transport of the film support containing this layer through the electrostatic plain paper copier. These beads are preferably butylmethacrylate modified polymethylmethacrylate beads of average particle size ranges of about 1 micron to 50 micron, (such as with a mean volume diameter of 8 to 15 microns). These beads, and their manufacture, are described in detail in U.S. Pat. No. 2,701,245. In addition to assisting transport of the film element, these beads also have a refractive index similar to the refractive index of the acrylate binder and thus are advantageous since they do not interfere with the light passing through the element when used in overhead projection. Polyethylene microspheres are present in the coating solution solids in amounts from 0.5% to 8% by weight and preferably from 2% to 4%. The larger, butylmethacrylate modified polymethacrylate beads are usually present in the coating solution solids in amounts from 0.5% to 10% by weight and preferably from 1.5% to 5%.

This invention will now be illustrated by the following examples, of which Example 1 is considered to be the best mode. All parts and percentages are by weight unless otherwise indicated.

EXAMPLE 1

The following were prepared in separate vessels:

Binder Solution:

| Ingredient | Amount (lbs) |
|---|---|
| Deionized Water | 655.00 |
| Ammonium Hydroxide (Conc.) | 6.61 |
| Polymethylmethacrylate (Carboset ® 525, B. F. Goodrich Co.) | 73.50 |

These materials were stirred until all of the acrylate binder dissolved therein:

Bead Slurry:

| Ingredient | Amount (lbs) |
|---|---|
| Deionized Water | 23.00 |
| Surfactant (Triton X100, (Rohm & Haas Co.) | 1.00 |
| Polymethylmethacrylate Beads | |

-continued

| Ingredient | Amount (lbs) |
|---|---|
| (75% solids in water, ca. 12 micron particle size) | 4.59 |

The beads are stirred until well dispersed in the water/surfactant. After the binder had gone into solution and the temperature was about 25° C., the bead slurry was added thereto with stirring. This mixture was termed the 'binder/bead mixture'.

In yet another vessel the following ingredients were mixed:

| Ingredient | Amount (lbs) |
|---|---|
| Deionized Water | 1,035.00 |
| Aziridinyl Cross-Linking Agent (PFAZ 322, Sybron Co.) | 9.60 |
| Polymeric Antistatic Agent (VERSA TL-4 National Starch Co.) | 47.94 |

The pH of this solution was adjusted to ca 6.7 with dilute sulfuric acid and then 2.60 lbs. of a wetting agent (Triton X-100, Rohm & Haas Co.) added thereto. When all of these ingredients were thoroughly mixed, the binder/bead mixture prepared previously was pumped into the aforesaid solution while the temperature was maintained at ca. 25° C. After this step was complete, 8.24 lbs of a submicron polyethylene bead slurry (40% beads, Poligen PE BASF Co.) with a particle size of about 0.2 micron was added to complete the formulation of the toner receptive layer of this invention. An analysis of this material showed the following results:

| | |
|---|---|
| Total % solids | 5.9 |
| pH | 7.6 |
| Surface Tension | 38.2 dynes/cm. |

Based on a 6% solids solution, the various ingredients were present as follows:

| Ingredient | % |
|---|---|
| Cross-linker | 8.00 |
| Antistat | 22.00 |
| Wetting Agent | 3.00 |
| Binder | 61.25 |
| Large Beads | 3.00 |
| Submicron Beads | 2.75 |

This material was then coated on a polyethylene terephthalate film support (4 mil thick) which had previously been coated with a conventional resin sub layer. The mixture was coated at ca. 28° C. using an air knife contact pressure of six inches and dried. The layer obtained was ca. 0.1 mil thick and the coated element was then heat relaxed at 140° C. Samples of this coating were then processed through representative commercially available electrostatic plain paper copy machines with excellent results. The films processed through this machine without problems (jams, etc.) and the surfaces was of excellent quality (no scratches, etc.). The images imparted thereon were of high quality eminently suitable for overhead transparencies.

EXAMPLE 2

In a like manner, a mixture suitable for making the toner receptive layer of this invention was made as described in Example 1 except for the binder. Elvacite 2540 was employed as the binder:

| Ingredient | % |
|---|---|
| Cross-linker | 8.00 |
| Antistat | 21.00 |
| Wetting Agent | 3.25 |
| Binder (Elvacite 2540) | 63.75 |
| Large Beads | 1.50 |
| Submicron Beads | 2.50 |

EXAMPLES 3-5

Various films were coated with toner receptive layers made according to Example 1 as shown below.

Example 3—one side without any coating, other side with coating (paper interleaved).

Example 4—both sides coated (paper interleaved).

Example 5—both sides coated (no paper interleaved).

In each case, the films processed well in the copy machine and produced good images thereon.

We claim:

1. An element suitable for preparing electrostatic transparencies comprising a polyester support having coated thereon in order at least one subbing layer, and a toner receptive layer, wherein said toner receptive layer comprises an acrylate binder containing carboxylic acid groups, a polymeric antistatic agent having carboxylic acid groups thereon, a cross-linking agent, butylmethacrylate modified polymethacrylate beads and polyethylene or tetrafluoroethylene beads.

2. The element of claim 1 wherein the modified polymethylmethacrylate beads have an average particle size of about from 1 to 50 microns and the polyethylene or tetrafluoroethylene bead have a particle size less than one micron.

3. The element of claim 1 wherein a subbing layer is applied to both sides of said support and a toner receptive layer is coated on both of said subbing layers.

* * * * *